United States Patent [19]
Bozzo

[11] Patent Number: 6,010,068
[45] Date of Patent: Jan. 4, 2000

[54] CREDIT DOCUMENT CONNECTED TO A DOCUMENT OR CUSTOMIZED CARD, INDEPENDENT CUSTOMIZED CREDIT CARD AND ASSOCIATED ISSUANCE AND VALIDATION EQUIPMENT

[75] Inventor: Ferdinando Bozzo, Salzburg, Austria

[73] Assignee: Nadir Technology Company Limited, Dublin, Ireland

[21] Appl. No.: 08/776,417

[22] PCT Filed: Aug. 10, 1994

[86] PCT No.: PCT/IT94/00135

§ 371 Date: Jan. 30, 1997

§ 102(e) Date: Jan. 30, 1997

[87] PCT Pub. No.: WO96/05576

PCT Pub. Date: Feb. 22, 1996

[51] Int. Cl.⁷ ...................................................... G06K 5/00
[52] U.S. Cl. ............................................ 235/380; 235/379
[58] Field of Search .................................... 235/379, 380, 235/382, 382.5

[56] References Cited

U.S. PATENT DOCUMENTS

| | | |
|---|---|---|
| 3,930,924 | 1/1976 | Oka et al. . |
| 4,016,404 | 4/1977 | Appleton . |
| 4,124,947 | 11/1978 | Kuhl et al. . |
| 4,948,174 | 8/1990 | Thomson et al. . |
| 4,993,068 | 2/1991 | Piosenka et al. . |
| 5,411,799 | 5/1995 | Loving . |
| 5,437,897 | 8/1995 | Tanaka et al. . |
| 5,566,327 | 10/1996 | Sehr . |

FOREIGN PATENT DOCUMENTS

| | | |
|---|---|---|
| 0097110 | 12/1983 | European Pat. Off. . |
| 0504616 | 9/1992 | European Pat. Off. . |
| 0590224 | 4/1994 | European Pat. Off. . |
| 2133941 | 12/1972 | France . |
| 2441222 | 6/1980 | France . |
| 2035642 | 6/1980 | United Kingdom . |
| 2256170 | 12/1992 | United Kingdom . |
| 8606527 | 11/1986 | WIPO . |

*Primary Examiner*—Harold I. Pitts
*Attorney, Agent, or Firm*—Young & Thompson

[57] ABSTRACT

A credit document connected to a customized document or card is formed of a watermarked paper support with at least one dotted safety coding in linear and cryptographic form on the basis of a key consisting of an individual code. The customized document or card incorporates a microchip for the memorization of the identification code and of at least one mathematical expression which encodes the fingerprint of one or more fingers of the user. The equipment for formation of the customized document or card, the credit documents and related validation includes a scanner for taking said fingerprints, compared with those of the owner of the customized document or card upon issuance of the document and during use at the point of sale. The watermarked paper support exhibits one or more copper-plate engraving print reliefs measured by a micrometric sensor integrated in the validation equipment. A customized credit card calls for memorization of the same parameters encoded in the related microchip.

5 Claims, 2 Drawing Sheets

CREDIT DOCUMENT CONNECTED TO A DOCUMENT OR CUSTOMIZED CARD, INDEPENDENT CUSTOMIZED CREDIT CARD AND ASSOCIATED ISSUANCE AND VALIDATION EQUIPMENT

TECHNICAL FIELD

The present invention relates to a credit document connected to a customized document or card, to an independent customized credit card, and to the related equipment for issuance and validation. Specifically the present invention relates to a credit document for provision of a payment system having the characteristics of absolute safety, and to the equipment which allows issuance, control and validation of the credit document and of the complementary identification document and a traditional credit card customized and validated by the above mentioned equipment.

BACKGROUND ART

As is known there exist various instruments for the settlement of commercial exchanges or the transfer of goods and services between one individual and another. In addition to legal tender, used in general for negotiations of small amount, there are used credit documents, e.g. bank and bankers checks, whose function is to limit the risks connected with circulation of said credits. Another instrument used widely and which allows making payments consists of credit cards consisting of non-transferable documents which authorize the holder to purchase goods and services from third parties approved by the issuer of the card, in general banks and financial organizations, to which is transferred the onus of payment.

The payment instruments alternative to cash avoid the user's holding available an amount of money, sometimes large, with the related risks. Even these instruments are not considered quite safe. Credit cards can be readily used by third parties at least up to the time of reporting of their robbery or loss, while checks, despite numerous provisions adopted, can be skillfully counterfeited and falsified. Given the large number of payment operations performed each day it is understandable that these problems are perceived in a very serious manner, considering that they involve simultaneously numerous individuals, i.e. the customers, credit organizations, and the authorities responsible for control and repression.

SUMMARY OF THE INVENTION

The purpose of the present invention is to obviate the shortcomings set forth above. Specifically the purpose of the present invention is to provide a payment means in the form of a credit document which is extremely safe, useable only by the person to whom issued on the basis of a customized document. Another purpose of the present invention is to achieve the same guarantee as concerns safety for the widely used credit cards.

Another purpose of the present invention is to provide the specific equipment for creation of the credit documents and related customized document, of the independently customized credit card, and control and validation thereof.

These and other purposes are achieved by the credit document connected to a customized document or card, independently customized credit card integrated with a microchip, which is the object of the present invention, which comprises basically a watermarked paper support with copper-plate engraving print characterized in that it exhibits one or more safety codes related to the data of the transaction, expressed in two fields, in linear dotted and/or cryptographic form on the basis of a key consisting of an identification code and at least one mathematical expression which encodes the fingerprint of one or more fingers of the customer on the credit document and which is memorized in the microchip of the card or credit card.

The constructive and functional characteristics of the credit document connected to a document or customized card and of the independently customized credit card which is the object of the present invention as well as the associated formation, control and validation equipment for said document are set forth in the description of a preferred embodiment thereof given below by way of non-limiting example with reference to the annexed drawings in which:

DESCRIPTION OF THE PREFERRED EMBODIMENT

Figure 1:
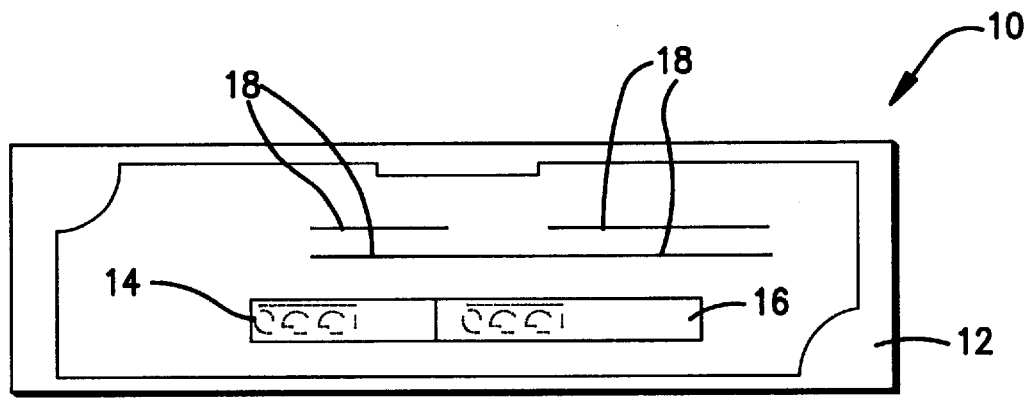
FIG. 1 shows schematically an example of a configuration of the paper support forming the credit document which is the object of the present invention.

With reference to the figures, the paper support forming the credit document which is the object of the present invention indicated by 10 in FIG. 1 is made up of a strip of watermarked paper 12 having preferably the same size as the traditional bank check and on which are achieved two fields 14, 16 for application of the safety code of the type with dots and hence not interpretable on sight. The device provided in the field 14 comprises for example the date of issuance of the document, the issuer's code (bank or financial institution) and the amount. The data shown in field 16 is expressed in cryptographic form by means of a key consisting of an individual code which is associated univocally with the owner of the document. Said individual code is preferably made up of an alphanumeric sequence.

The paper support 10 achieved with copper-plate engraving comprises also one or more print relieves formed along predetermined areas of the strip 12 and detectable by means of sensors integrated in the validation equipment discussed below. Some parts immediately detectable on sight of the paper support 10 forming the credit document are indicated by way of example by reference numeral 18 on the strip 12 formed by copper-plate engraving or other print systems to identify the issuing bank or institution, the amount of the credit document and its serial number, payment order, etc. Application of the safety code on the credit document for issuance to the customer requesting it, is subject to possession of a special customized document in the form of a card. Said card constitutes an integral part of the document and allows first issuance with the safety code and subsequent validation upon use. The personal card, advantageously proposed in the form of an electronic smart card having the same size as a credit card, incorporates a microchip on which is memorized the individual code in the form of an alphanumeric sequence as well as a univocal personal characteristic of the user or applicant. Said personal characteristic in accordance with the present invention consists of a mathematical expression which encodes the parameters associated with the fingerprint of one or more fingers of the user or applicant. It is known that the fingerprint is defined by the projections of the skin which give rise to figures which do not change with the passage of time in the same person. This peculiar aspect then gives rise to a univocal personal characteristic adopted here without creation of a centralized fingerprint file by means of encoding the fingerprint in a mathematical expression wherein readings are taken at a sufficient number of points so as to avoid interpretative doubts. The taking of said readings which may be between 150,000 and 250,000 points, is performed by a special transparency, diagrammed in FIG. 2, with which the card in question is customized.

The above mentioned device comprises a reader-codifier 20 for the card 22, a control unit 24 connected by means of line 26 to the bank information system and a scanner 28 designed for reading the fingerprint or fingerprints of the customer which are memorized after coding in the microprocessor integrated in the card 22.

The scanner 28 is provided with a seat 28' appropriately formed and sized on which the customer places the finger or fingers for taking the fingerprint to be coded and memorized in the microprocessor. The latter contains also the key for encoding the fingerprint with points present in cryptographic form in field 16 of the strip 12 forming the paper support 10.

Figure 2:
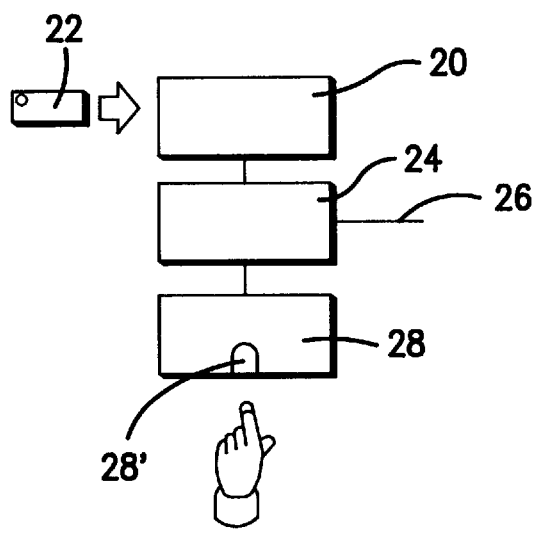
FIG. 2 shows a block diagram of the equipment for creation of the identification document connected to the credit document.

Said key or individual code consisting of an alphanumeric sequence univocally associated with each card holder is generated by the issuer information system, e.g. the bank, and transmitted to the device for customization of the card 22, discussed below, through the line 26 of the device diagrammed in FIG. 2.

Figure 3:
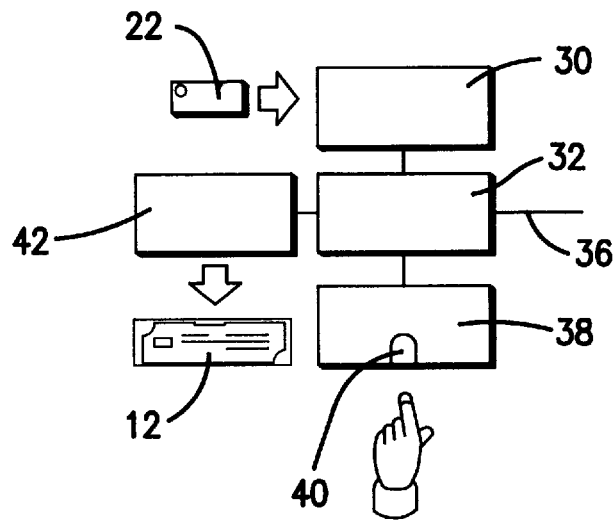
FIG. 3 shows a block diagram of the equipment for issuance of the credit document on the basis of the identification document.

The card 22 containing the individual alphanumeric code and the mathematical expression associated with the fingerprint or fingerprints constitutes the basic document for arranging, by the issuing organization, the credit document on request of the customer by means of the device or equipment diagrammed in FIG. 3. Said equipment comprises a reader-codifier 30 for the card 22, a control unit 32 connected by means of line 36 with the issuer information system, e.g. the bank, to register the data of the transaction (date, customer, agency, size of the credit document), a scanner 38 with window 40 for application of the finger or fingers of the customer for the taking of fingerprints, and commercial printer 42 preferably arranged external to the device and having graphic modes and advantageously equipped with an automatic feeder for supplying the strip 12 forming the paper support 10 to be customized.

The customization of the credit document, as mentioned above, leads to a safety coding defined by a dot code applied in the fields 14, 16 of the paper support 10. The coding is subject to validation of the fingerprint or fingerprints of the customer who places his finger or fingers opposite the window 40 of the scanner 38. Only after verification of the agreement between the mathematical parameters of the memorized fingerprint and those of the finger placed in the window 40 is the identification code of the customer read and used as a cryptographic key for the univocal generation of the safety code to be placed in the fields 14, 16 of the document requested by the customer in accordance with the above described procedure.

Figure 4:
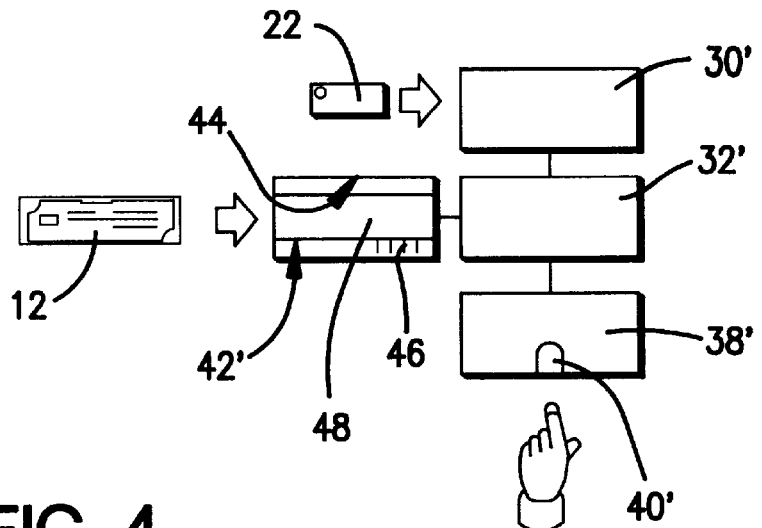
FIG. 4 shows a block diagram of the equipment designed to validate the credit document.

A device designed for validation of the credit document at the point of sale is diagrammed in FIG. 4 and calls for in addition to the components defined above relating to the equipment for issuing the customized document, a verifier 48 for reading of the dot code or codes 14 and/or 16 of the paper support 10, a micrometic sensor 44 designed for measurement of the print relief achieved along prearranged points of the support and a perforation head 46 which performs cancellation of the credit document.

The operation of the above described devices is as follows: the customer who requests the bank or analogous institution to issue the credit document which is the object of the present invention first applies his finger, or optionally several fingers in sequence, in the seat created on the device for issuance of the card, diagrammed in FIG. 2. The fingerprint or fingerprints are taken and memorized in algorithm form in the microchip of the card 22 without the creation of archives of the configuration of the fingerprint. Through the communication line 26 the bank system records the operation which gives rise to the issuance of the card and supplies the individual identification code consisting of the alphanumeric sequence, also memorized in said microchip. The next step concerns issuance of the customized document or documents, performed by the device of FIG. 3 which, after insertion of the card 22 and the application of the finger in the window 40 of the scanner 38, takes and compares the fingerprint and prints, preferably with indelible ink, the dotted safety coding in fields 14 and 16 of credit document 10.

After these described operations the customer has available the univocally customized card and the requested credit documents, spendable at the various approved points of sale. Upon using said credit documents the customer, in order to give suitable guarantees, places his finger or fingers in the window 40' of the scanner 38', of the device for validation shown in FIG. 4, installed at the point of sale. Comparison is made between the picture taken by the scanner 38' and the fingerprint memorized in the microchip of the card 22 inserted in the reader 30' of the above device. In the event of positive matching, there is read the identification code of the customer by means of the linear optical sensor 42' and micrometric sensor 44.

The sensor 42' reads the dotted code of the credit documents, verifying the correctness of the data and ascertaining the univocal matching of the credit document with the card of the bearer. The micrometric sensor 44 measures the relief of the engraving print at some points of the credit document to ascertain the validity of the paper support 10. After performing these checks, the perforation head 46 cancels the credit document by means of perforations which define the current account number of the subject who receives the credit document.

Figure 5:
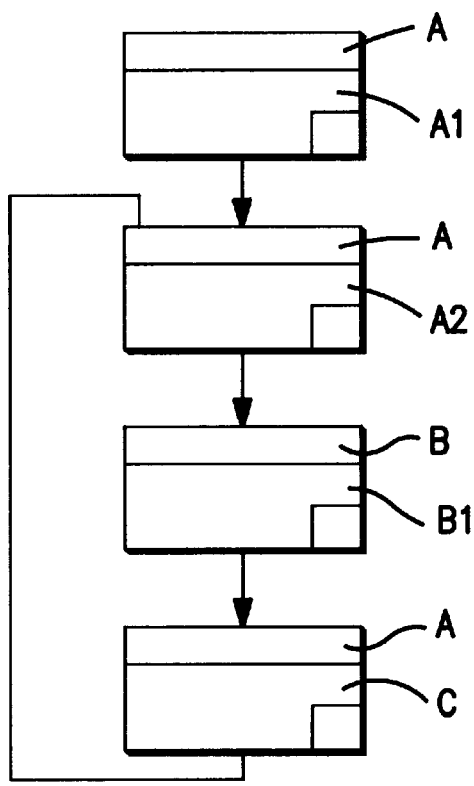
FIG. 5 shows the flow diagram of the payment system starting from creation of the identification document.

The credit payment flow of the payment system performable by the credit document which is the object of the present invention is diagrammed in FIG. 5 in which are shown the various phases. The issuing organization A provides in the first place, a device A1, for issuance of the personal card. Said organization, with the device A2, then issues the credit documents requested by the customer. At the payment point, indicated by B, the device or equipment B1 validates the credit document. The latter then returns to the issuing organization A for actual collection C which completes the cycle.

In the hypothesis relating to the traditional credit card, the microship which is provided in the card allows performing memorization of one or more fingerprints of the owner. Equipment basically identical with that for the card 22, connected to the paper support 10, permits provision of said memorization and subsequent reading or taking of the fingerprint or prints for validation of the credit card. The customization of the latter can involve also the memorization by the microchip of an individual code of the type provided for the card 22. The customized credit card is preferably used independently to perform normal payments but can optionally replace the card 22 for the request and validation of the credit document.

As may be seen from the foregoing, the advantages of the present invention are clear. The credit document which is the object of the present invention connected to the customized card provides an absolute guarantee since it is unusable by any one other than the owner to whom it is issued. The receiver, in addition, has the certainty of the authenticity and validity of the credit document which can be considered cash.

The equipment or device provided for issuance of the card or credit document as well as that of validation, allow performance of all the operations of forming and checking of the supports in short time frames and which excludes every risk of theft. Particularly advantageous is the capability of taking several fingerprints of the customer's fingers and coding them in a mathematical expression. One of the fingerprints can optionally be memorized in the form of an alarm signal blocking the transaction, for example in the event the customer is coerced or forced to use a credit document. Another advantage is the capability of customizing traditional credit cards by means of memorization of one or more fingerprints of the owner, encoded in a microchip integrated in the card. The latter consequently cannot be used by a person who is not the owner. At the point of sale, the receiver can verify easily the agreement of the fingerprint of the customer with that of those memorized in the microchip of the credit card presented.

The invention as described above and claimed below is proposed merely by way of example and it is understood that it can have numerous modifications and variations all falling within the inventive concept. It is intended to be possible in optional alternative reversals of structure or displacement of component parts which as a whole form the equipment for formation and management of the credit documents which are the object of the present invention and alternative, formal or structural configurations of the credit documents.

I claim:

1. A credit document (10) relating to a transaction and connectable to a customized document or card (22) or independent customized credit card including a microchip, said credit document (10) comprising a watermarked paper support (12) with copper-plate engraving print provided with a biometric code related to at least one fingerprint of a regular owner of the credit document, wherein said credit document (10) is provided with at least one safety code referring to data of said transaction expressed in two fields (14, 16) based on a key consisting of a personal identification code, and wherein the microchip of the customized document or card (22) or independent customized credit card is provided with the personal identification code in the form of an alphanumeric sequence and with at least one mathematical expression which encodes parameters associated with said at least one fingerprint coded on the credit document.

2. The credit document according to claim 1, wherein the safety codes are expressed in linear dotted form.

3. The credit document according to claim 1, wherein the safety codes are expressed in cryptographic form.

4. The credit document according to claim 1, wherein the identification code is generated by issuer's information system and consists of an alphanumeric sequence.

5. The credit document according to claim 1, wherein the safety codes are applied by indelible ink on the watermarked paper support (12) further provided with at least one copper-plate engraving print relief.

* * * * *